United States Patent [19]

Noguchi et al.

[11] Patent Number: 5,109,492
[45] Date of Patent: Apr. 28, 1992

[54] MICROPROCESSOR WHICH TERMINATES BUS CYCLE WHEN ACCESS ADDRESS FALLS WITHIN A PREDETERMINED PROCESSOR SYSTEM ADDRESS SPACE

[75] Inventors: Kouki Noguchi, Kokubunji; Yoshimune Hagiwara, Hachioji; Kazuhiko Iwasaki, Hachioji; Hirokazu Aoki, Hachioji; Shigeru Shimada, Hoya, all of Japan

[73] Assignee: Hitachi, Ltd., Tokyo, Japan

[21] Appl. No.: 84,808

[22] Filed: Aug. 13, 1987

[30] Foreign Application Priority Data

Sep. 19, 1986 [JP] Japan .................. 61-219561
Sep. 24, 1986 [JP] Japan .................. 61-223516

[51] Int. Cl.⁵ .............................. G06F 13/36
[52] U.S. Cl. .................. 395/325; 364/232.8; 364/240; 364/242.42; 364/925.6; 364/935.4; 364/DIG. 1
[58] Field of Search ... 364/200 MS File, 900 MS File

[56] References Cited

U.S. PATENT DOCUMENTS

| 3,970,999 | 6/1926 | Elward | 364/200 |
|---|---|---|---|
| 4,000,485 | 12/1928 | Barlow et al. | 364/200 |
| 4,181,938 | 1/1980 | Suzuki et al. | 364/200 |
| 4,371,926 | 2/1983 | Yamaura et al. | 364/200 |
| 4,466,098 | 8/1984 | Southard | 371/9 |
| 4,567,606 | 1/1986 | Vensko et al. | 364/900 |
| 4,580,213 | 4/1986 | Hulett et al. | 364/200 |
| 4,620,279 | 10/1986 | Read et al. | 364/200 |
| 4,658,349 | 4/1987 | Tabata et al. | 364/200 |
| 4,674,037 | 6/1987 | Funabashi et al. | 364/200 |
| 4,700,292 | 10/1987 | Companini | 364/200 |
| 4,709,328 | 11/1987 | Anthony, Jr. et al. | 364/200 |

Primary Examiner—Thomas C. Lee
Assistant Examiner—Ayni Mohamed
Attorney, Agent, or Firm—Antonelli, Terry, Stout & Kraus

[57] ABSTRACT

A microprocessor suitable for a high speed processor system prevents extension of a bus cycle due to delay of generation of a bus cycle end signal and effectively utilizes a characteristic of a high speed accessable external device.

14 Claims, 5 Drawing Sheets

MICROPROCESSOR WHICH TERMINATES BUS CYCLE WHEN ACCESS ADDRESS FALLS WITHIN A PREDETERMINED PROCESSOR SYSTEM ADDRESS SPACE

BACKGROUND OF THE INVENTION

The present invention relates to a microprocessor having bus cycle control means.

In a processor system comprising a microprocessor and plural memories, when the system configuration is of large scale, an asynchronous bus control system is used because it is necessary to connect with external devices, such as memories having different access times, through a bus.

FIG. 5 shows a configuration of a processor system of an asynchronous bus control type which was proposed by some of the inventors of the present invention and others, but was not known prior to the priority date of the present invention. A microprocessor 500 and external devices 150 and 151 are connected through an asynchronous transmission bus 130.

In this system, a bus cycle starts when a control unit 101 in the microprocessor 500 produces an address signal on line 132. When the address signal on line 132 is established, an asynchronous bus control circuit 103 asserts an address valid signal A.V. on line 134 at the timing of the address signal on line 132. Accessing of the external devices 150 and 151 is started after the assertion of the address valid signal on line 134 has been confirmed. An access end detector 140 arranged externally of the microprocessor 500 monitors the address signal on line 132 and address valid signal 134, and provides a data complete signal D.C. on line 141 after a bus cycle time required for the external device being accessed. The microprocessor 500 reads in the data complete signal D.C. from line 141 and produces at least one of a wait release signal WAIT on line 104 and bus cycle end signal END on line 105 to the asynchronous bus control circuit 103 through a synchronizing circuit 102 which synchronizes the timing to an internal clock. Thus, the control unit 101 detects the end of one bus cycle and starts the next bus cycle if required. FIG. 6 shows a timing chart of such asynchronous bus control.

In the asynchronous bus control system, it is necessary to provide the access end detector 140 externally of the microprocessor to generate the data complete signal to terminate the bus cycle. When such an access end detector is arranged externally of the microprocessor, not only the hardware increases, but also the generation of the data complete signal is delayed because the generation logic therefor is complex, and the bus cycle is extended.

SUMMARY OF THE INVENTION

It is an object of the present invention to provide a microprocessor suitable for a high speed processor system which prevents the extension of a bus cycle due to the delay of generation of a bus cycle end signal and effectively utilizes a characteristic of an external device which allows high speed access.

The above object is achieved by generating the bus cycle end signal in a chip when the high speed access device is accessed so that the bus cycle is terminated in a minimum bus cycle, normal accessing is done in a synchronous system in a user-specified bus cycle, and accessing which takes a longer time than that of the normal accessing is done by asynchronous bus cycle.

DESCRIPTION OF THE PREFERRED EMBODIMENTS

The preferred embodiments of the present invention are now explained with reference to the accompanying drawings.

Figure 1:
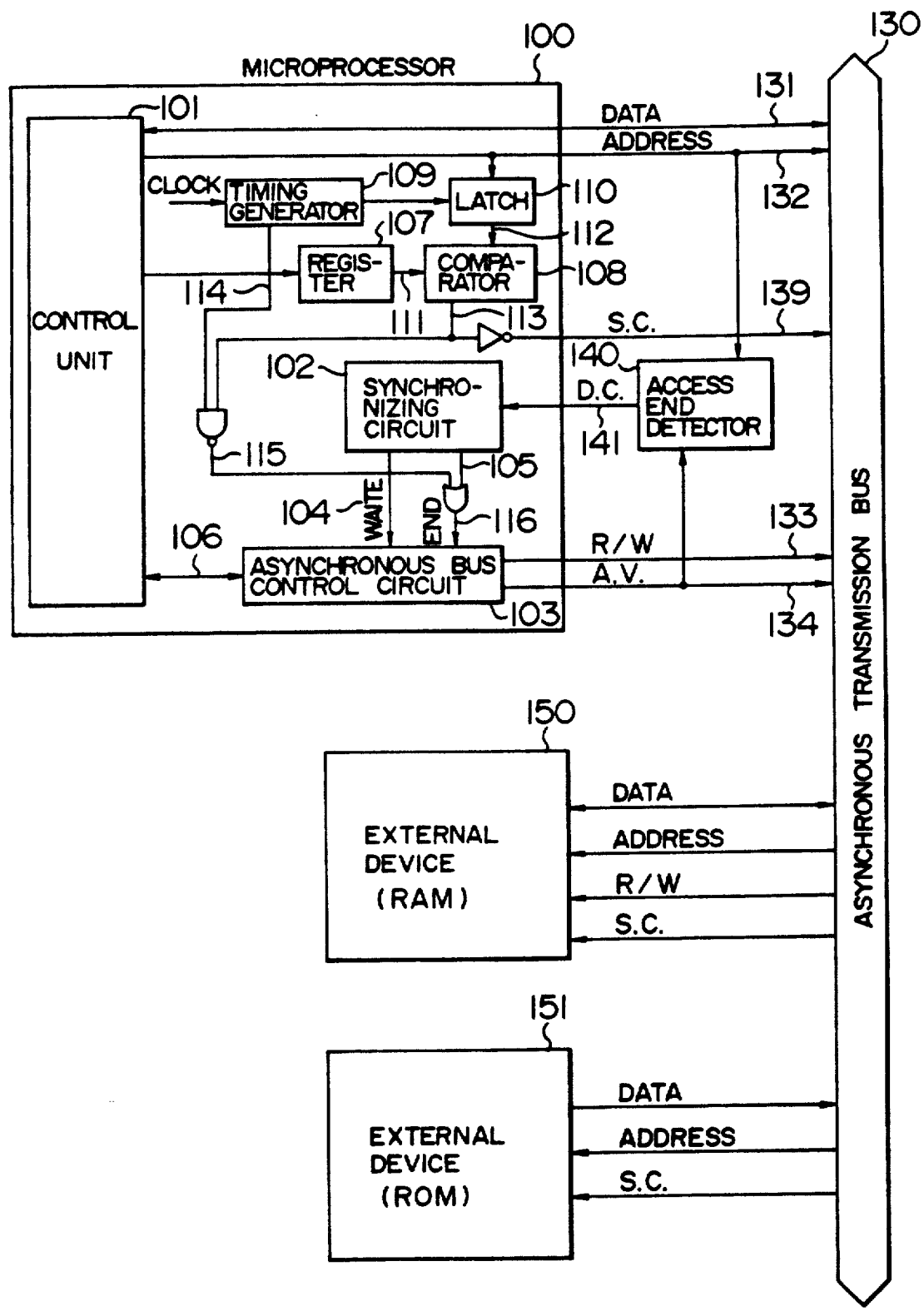
FIG. 1 shows a configuration of a processor system which embodies a microprocessor in accordance with one embodiment of the present invention.

FIG. 1 shows a configuration of a processor system which embodies a microprocessor in accordance with one embodiment of the present invention. A microprocessor 100 and external devices 150 and 151 are interconnected through an asynchronous transmission bus 130.

A bus cycle of the system is initiated by output of an address signal on line 132 by the control unit 101 in the microprocessor 100. A transition information signal 106 is sent from the control unit 101 to asynchronous bus control circuit 103 to initialize it. Then, the bus cycle is initiated. Thus, the asynchronous bus control circuit 103 asserts an address valid signal A.V. on line 134 and produces a R/W signal on line 133 to indicate whether it is a read operation or a write operation. Accessing of the external device is initiated after the confirmation of assertion of the address valid signal A.V. on line 134.

In the present embodiment, when a high speed accessable external device is accessed, a bus cycle end signal is generated in the microprocessor which is usually on one chip so that the bus cycle is terminated in a minimum bus cycle. In accessing other external devices, the bus cycle end signal is generated externally of the microprocessor.

It is common to arrange the high speed accessable external device in a specific address space. It is therefore possible to determine whether the bus cycle end signal is to be generated in the chip or not by checking whether the access address is in the specific address space or not. The internally generated bus cycle end signal is ORed with the bus cycle end signal supplied externally of the chip (generated by a peripheral device) and the output of the OR circuit is supplied to a conventional asynchronous bus control circuit.

The address space for the high speed accessible external device is specified by an address area designation register 107. Designation information is written into the register 107 by an instruction as is done for control registers, such as a condition code, register of the microprocessor. Address space information 111 designated by the register 107 is supplied on line 111 to a comparator 108. On the other hand, an address signal on line 132 from the control unit 101 to asynchronous transmission bus 130 is also supplied to a latch 110, synchronized by a control signal from a timing generator 109, and supplied to the comparator 108 as an access address signal on line 112. The comparator 108 compares the two signals on lines 111 and 112 to determine whether the access address exists in the space designated by the register 107 or not, that is, whether the accessing is to the high speed accessable external device or not.

Figure 2:
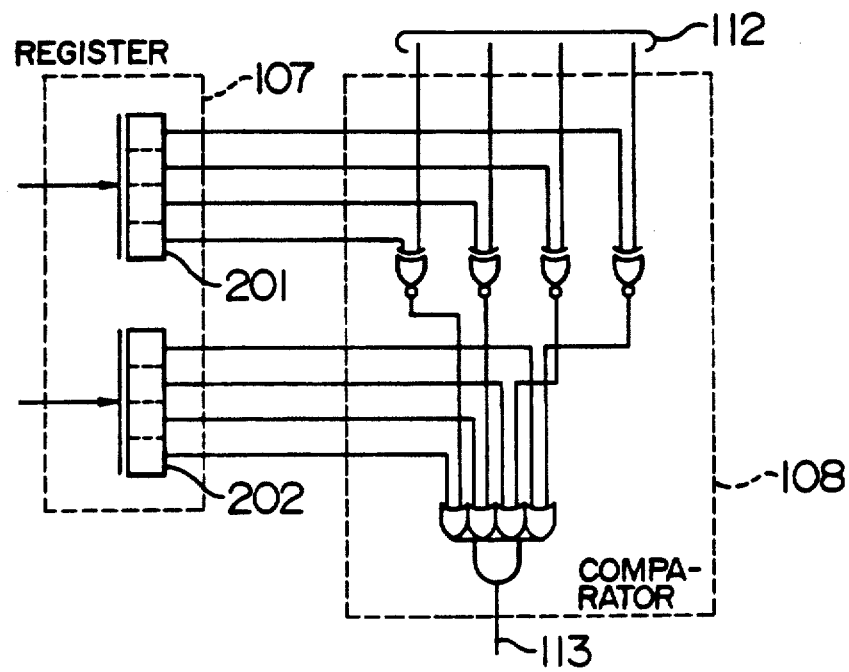
FIG. 2 shows details of register 107 and comparator 108 of FIG. 1.

Details of the address area designation register 107 and the comparator 108 are now explained with reference to FIG. 2. The address area designation register 107 comprises a register 201 for designating an address space and a mask register 202 for defining validity of the bits designated by the register 201. If all bits in the mask register 202 are "1", a "1" signal indicating that the access address is in the designated area is outputted on line 113 regardless of the address on line 112. In this case, the bus cycle end signal is generated in the microprocessor. On the other hand, if all bits in the mask register 202 are "0", a "0" signal indicating that the access address on line 112 is not in the designated area is produced unless the access address on line 112 exactly matches the content of the register 201. A plurality of pairs of area designation registers 107 and comparators 108 may be provided. In this case, the outputs (113) of the comparator 108 are ORed. This circuit may be implemented by an associative memory. The output on line 113 of the comparator 108 indicates that the access address is in the designated area, that is, the bus cycle end signal is to be generated in the microprocessor. The signal 113 is ANDed with an output 114 of a timing generator 109 in an AND gate G1 to match the timing, and an output on line 115 thereof is ORed in an OR gate G2 with an END signal on line 105 from the synchronizing circuit 102. The END signal on line 105 is generated by the synchronizing circuit 102 in the microprocessor which synchronizes a data complete signal D.C. on line 141 generated by an access end detector 140 external of the microprocessor with an internal clock signal. Prior to the data complete signal being generated, there is outputted from the synchronizing circuit 102 a signal WAIT on line 104 indicating the bus cycle wait. When the signal 104 is negated at the time of generation of the data complete signal by the access end detector 140 on line 141, it indicates the end of a bus cycle. When the access address on line 132 is to access another external device than the high speed accessable external device, the bus cycle end signal on line 105 generated externally of the microprocessor is utilized. The generation of the data complete signal D.C. on line 141 from the access end detector 140 has been described in the Background of the Invention.

The output signal on line 116 of the OR gate G2 is supplied to the asynchronous bus control circuit 103 as the end signal. When the signal 116 is asserted, the state in the asynchronous bus control circuit 103 changes from a start state to an end state. Thus, the bus cycle is terminated in a minimum bus cycle, and the control unit initiates the next access if it is required and stops the access if it is not required.

The output signal on line 113 of the comparator 108 may be taken out of the microprocessor chip in order to indicate to the external device that the bus cycle end signal is to be generated in the microprocessor. Such a signal is represented by a synchronous cycle signal S.C. on line 139.

Figure 3:
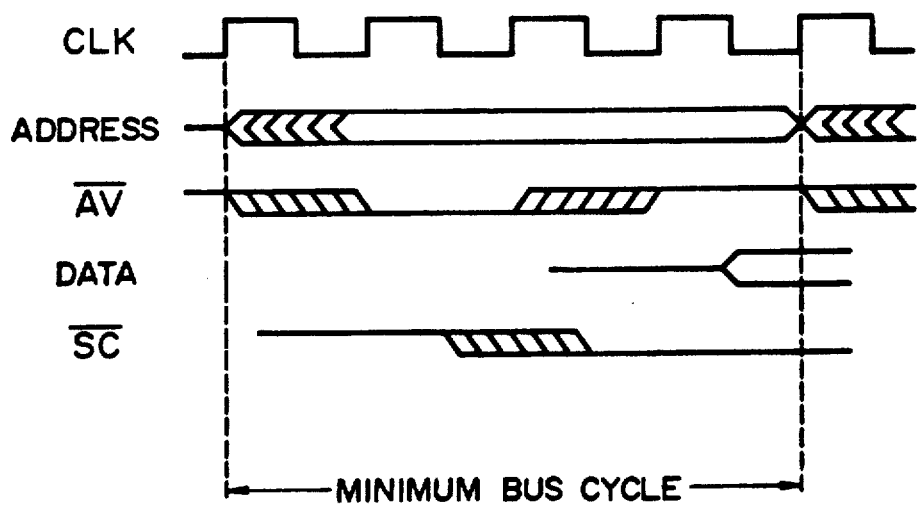
FIG. 3 shows a timing chart of a bus cycle of the microprocessor of FIG. 1.

FIG. 3 shows a timing chart when the bus cycle end signal is internally generated. The bus cycle is fixed to a minimum one and the signal S.C. on line 139 which indicates that the access address is in the designated area is asserted.

Figure 4:
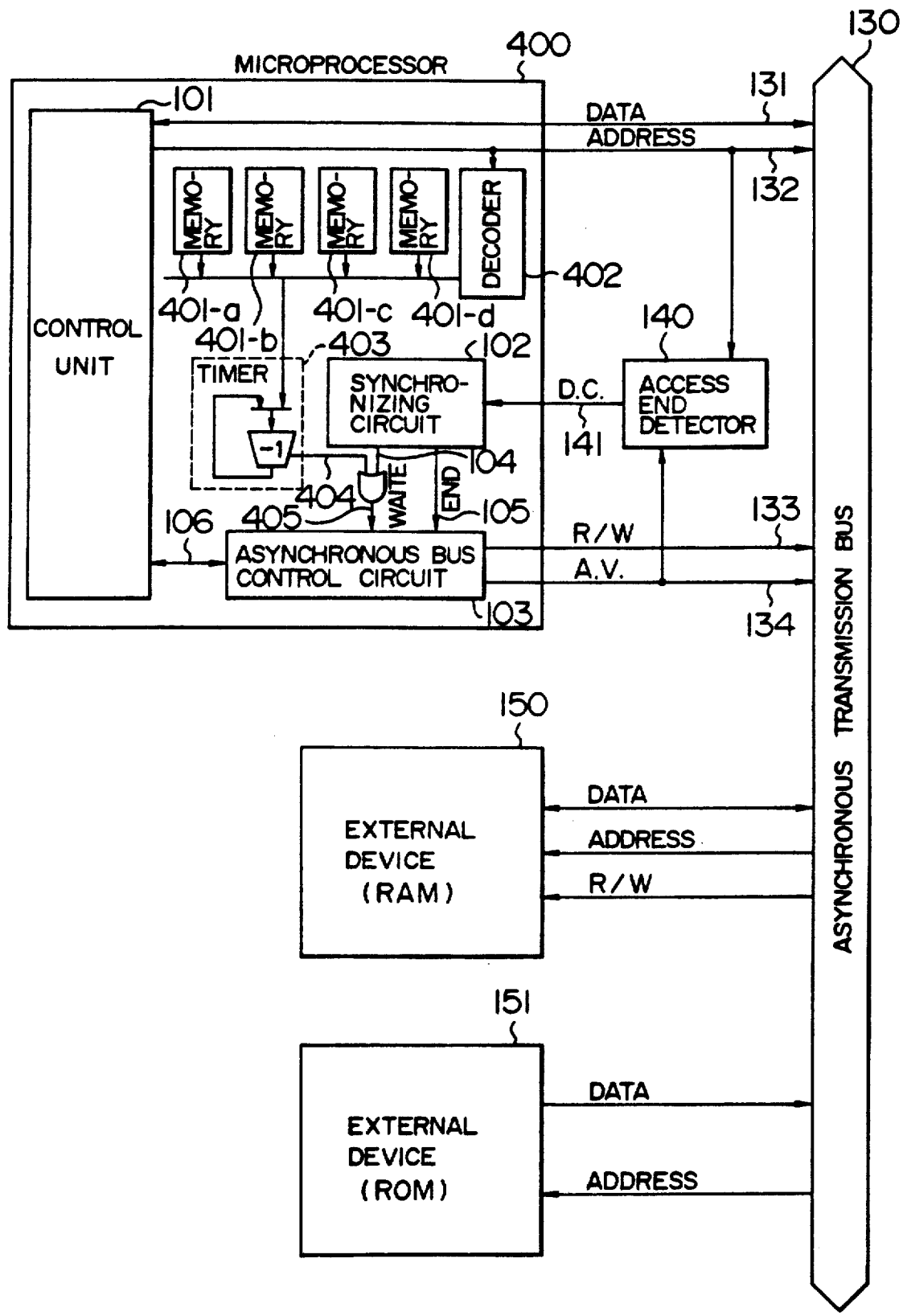
FIG. 4 shows a configuration of a processor system which embodies a microprocessor in accordance with another embodiment of the present invention.
Figure 5:
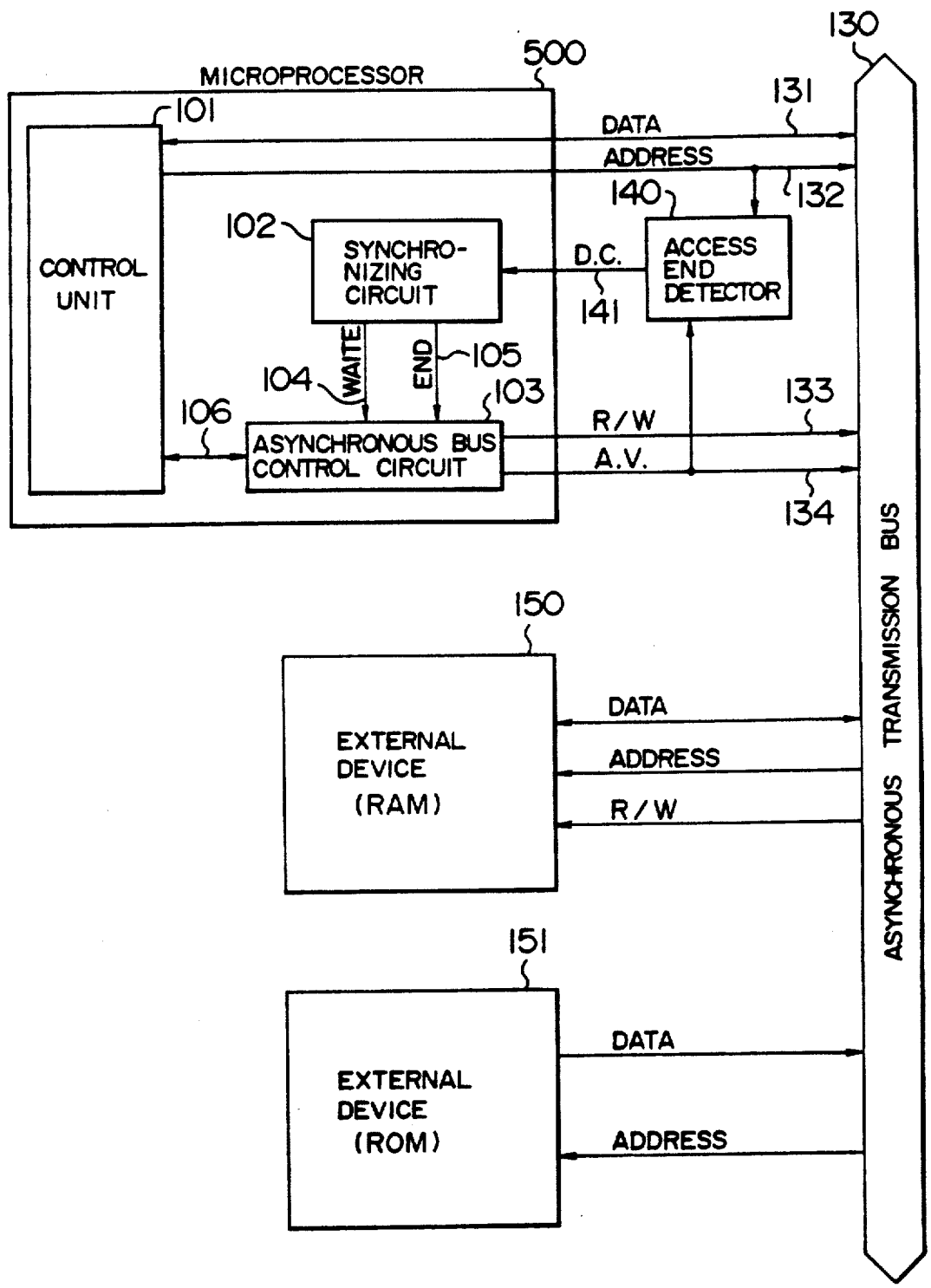
FIG. 5 shows a configuration of an asynchronous processor system proposed earlier by some of the inventors of the present invention and others.
Figure 6:
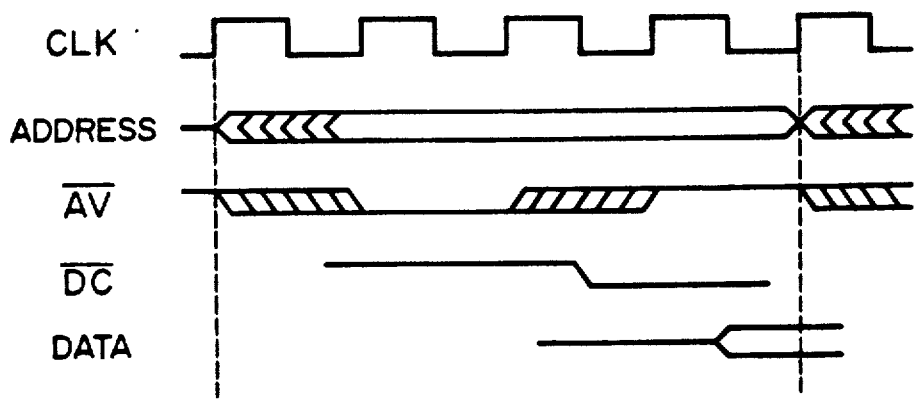
FIG. 6 shows a timing chart of a bus cycle of the microprocessor of FIG. 5.

Another embodiment of the present invention is explained with reference to FIG. 4 which shows a configuration of a processor system which embodies the microprocessor of the present embodiment. A microprocessor 400 and external devices 150 and 151 are interconnected through an asynchronous transmission bus 130, and the initiation of the bus cycle, the address valid signal A.V. on line 134 and the R/W signal on line 133 are performed in a manner similar to those in the previous embodiment.

In the present embodiment, normal accessing is done in a synchronous system in a specific bus cycle designated by a user, and accessing which requires a longer bus cycle than that of the normal accessing is done by the asynchronous bus cycle which uses the bus cycle generation signal generated externally of the microprocessor.

A timer is used to detect a bus cycle time designated by the user, and it produces a flag when the timer is timed out. This output and a signal indicating the wait, supplied externally of the microprocessor are ORed and an output thereof is supplied to the asynchronous bus control circuit 103 to control the bus 130. By using a timer which can set a plurality of settings and designating one of the settings by the access address, the devices having different access times may be arranged in the address space in order to optimize the bus cycle time.

The asynchronous bus control circuit 103 holds the wait state while the wait signal on line 405 is asserted in the bus cycle, and when the wait signal on line 405 is thereafter negated, it changes the state to the end state. Memories 401-a to 401-d store the bus cycle times (numbers of bus cycles) designated by the user. In the present embodiment, four such memories are provided. A decoder 402 decodes the address 132 to determine which one of the bus cycle settings stored in the memories is to be supplied to a timer 403. Usually several, high order bits of the address bits are decoded to designate the setting. The timer 403 decrements the input by one for each internal clock cycle, and when the result reaches a predetermined value (for example, 0), it negates a signal on line 404 which indicates the bus cycle wait. The timer 403 may be modified in several ways, for example, by incrementing a complement of the input by one for each clock cycle.

On the other hand, the data complete signal D.C. on line 141 generated by the access end detector 140 is synchronized by the synchronizing circuit 102. Prior to receipt of the data complete signal, the circuit 102 provides the signal WAIT on line 104 which indicates the bus cycle wait. When the signal 404 or 104 is negated, it indicates the end of bus cycle. Those signals are supplied to an OR gate G3. The output 405 of the OR gate G3 is the wait signal which is negated only when both of the two input signals are negated.

Thus, even if the data complete signal D.C. on line applied 141 externally of the microprocessor 400 is always fixed to indicate the bus cycle end, the bus cycle is held in the wait state until the timer is timed out. Accordingly, synchronous bus control is attained with the number of bus cycles designated by the user. The timer settings, that is, the numbers of bus cycles designated by the user are stored in the plurality of memories 401-a to 401-d. The setting to be supplied to the timer is designated depending on the decode output of the access address on line 132 by the decoder 402. The synchronous bus control is attained for the devices having different access times by arranging the devices having essentially equal access time in an address space in which the outputs of the decoders 402 are equal to each other and by setting the number of bus cycles in memories 401-a to 401-d.

For the device which requires a longer access time than the number of cycles set in the timer 403, a conventional asynchronous bus control is used, and the bus cycle wait and end information may be carried by the data completion signal D.C. on line 141. After the timer has been timed out, the signal on line 404 is negated to indicate the bus cycle end. If the data complete signal D.C. on line 141 is negated, that is, if it is at a level designating the bus cycle wait, the signal on line 104 is asserted and the input on line 405 to the asynchronous bus control circuit 103 remains at the level to indicate the bus cycle wait.

When the bus control is done only in the asynchronous system, the setting of the timer 403 is set to the minimum bus cycle so that it functions in the same manner as the conventional asynchronous bus control.

By constructing the setting memories 401-a to 401-d by non-volatile memories such as EPROM's, chips having different bus control specification are attained with identical chips. Thus, the user can set the bus control specification which fits the system in which the chip is used.

When the setting memories 401-a to 401-d are constructed by registers which are rewritable by an instruction, the bus control specification may be dynamically modified by a program (OS program).

We claim:

1. A microprocessor for use in a processor system in which the microprocessor is connected to an external device through a bus and in which there is provided external detecting means for indicating an end of accessing by said microprocessor to said external device, said microprocessor comprising:
    (a) control means for sending an access address to said bus to access said external device during a bus cycle;
    (b) designation means for designating a predetermined address area of a processor system address space;
    (c) compare means for comparing said access address with the address area designated by said designation means and for producing a match output when said access address falls within said predetermined address area; and
    (d) termination means coupled to said compare means for terminating a bus cycle of said control means in response to said match output from said compare means.

2. A microprocessor according to claim 1, wherein said designation means designates said predetermined address area in response to an instruction of the microprocessor.

3. A microprocessor according to claim 1, further comprising:
    (e) a synchronizing circuit for synchronizing a signal supplied from said external detecting means with an internal clock signal and for supplying a synchronized signal to said termination means to initiate operation thereof.

4. A microprocessor according to claim 3, further comprising:
    (f) output means for outputting the output of said compare means externally of the microprocessor.

5. A microprocessor according to claim 1, further comprising means for controlling the operation of said compare means so as to time the generation of said match signal supplied to said termination means.

6. A microprocessor according to claim 1, wherein the microprocessor is formed on one chip.

7. A microprocessor for use in a processor system in which the microprocessor is connected to first and second external device through a bus, and in which there is provided external detector means connected to said microprocessor and responsive to access by said microprocessor to said second external device for generating and supplying to said microprocessor a first signal after a bus cycle time required for said access, said microprocessor comprising:
    (a) control means for sending an access address to said bus to initiate access to one of said first and second external devices during a bus cylcle;
    (b) designation means for designating a predetermined address area, assigned to said first external device, in an address space of said processor system;
    (c) compare means for comparing said access address with the address area designated by said designation means for producing a second signal when said access address falls within said predetermined address area; and
    (d) termination means coupled to said compare means and responsive to one of said first and second signals for terminating a bus cycle of said control means.

8. A microprocessor according to claim 7, further comprising timing means for controlling the timing of said compare means in producing said second signal.

9. A microprocessor according to claim 7, further comprising an OR gate connected to receive said first and second signals, the output of said OR gate being connected to said termination means.

10. A microprocessor according to claim 7, wherein the microprocessor is formed on one chip.

11. A microprocessor for use in a processor system in which the microprocessor is connected to first and second external devices through a bus, and in which there is provided detector means connected to said microprocessor and responsive to access by said microprocessor to said first and second external devices for generating and supplying to said microprocessor first and second signals;
    said microprocessor comprising:
    (a) control means for sending an access address to said bus to initiate access to one of said first and second external devices during a bus cycle; and
    (b) termination means responsive to at least one of said first and second signals for terminating a bus cycle of said control means; and
    said detector means comprising:
    (x) designation means for designating a predetermined address area, assigned to said first external device, in an address space of said processor system;
    (y) compare means for comparing said access address with the address area designated by said designation means for generating said first signal when said access address falls within said predetermined address area; and (z) access end detection means for generating said second signal after a bus cycle time required for said access to said second external device.

12. A microprocessor according to claim 11, wherein the microprocessor is formed on one chip.

13. A microprocessor for use in a processor system in which the microprocessor is connected to an external device through a bus, said microprocessor comprising:

(a) control means for sending an access address to said bus to access said external device during a bus cycle;

(b) designation means for designating a predetermined address area of a processor system address space;

(c) compare means for comparing said access address with the address area designated by said designation means and for producing a match output signal when said access address falls within said predetermined address area; and (d) termination means coupled to said compare means for terminating a bus cycle of said control means in response to said match output signal from said compare means.

14. A microprocessor according to claim 13, wherein the microprocessor is formed on one chip.

* * * * *